(12) United States Patent
Strebel

(10) Patent No.: US 10,578,428 B2
(45) Date of Patent: Mar. 3, 2020

(54) METHOD FOR OPTICALLY MEASURING THE WELD PENETRATION DEPTH

(71) Applicant: Precitec GmbH & Co. KG, Gaggenau (DE)

(72) Inventor: Matthias Strebel, Gaggenau (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 0 days.

(21) Appl. No.: 16/041,251

(22) Filed: Jul. 20, 2018

(65) Prior Publication Data
US 2019/0041196 A1 Feb. 7, 2019

(30) Foreign Application Priority Data
Aug. 1, 2017 (DE) .......................... 10 2017 117 413

(51) Int. Cl.
*G01B 11/22* (2006.01)
*G01B 9/02* (2006.01)
(Continued)

(52) U.S. Cl.
CPC ............. *G01B 11/22* (2013.01); *B23K 26/032* (2013.01); *B23K 26/08* (2013.01); *B23K 26/21* (2015.10);
(Continued)

(58) Field of Classification Search
CPC .. G01B 11/22; G01B 11/2441; G01B 5/0037; G01B 9/0203; G01B 9/02083;
(Continued)

(56) References Cited

U.S. PATENT DOCUMENTS

| | | | |
|---|---|---|---|
| 6,215,094 B1 * | 4/2001 | Dausinger | B23K 26/032 |
| | | | 219/121.62 |
| 6,791,057 B1 * | 9/2004 | Kratzsch | B23K 26/032 |
| | | | 219/121.62 |
| 2016/0039045 A1 | 2/2016 | Webster | |

FOREIGN PATENT DOCUMENTS

| DE | 10155203 A1 | 6/2003 |
|---|---|---|
| DE | 102013015656 A1 | 3/2015 |

(Continued)

*Primary Examiner* — Michael P Stafira
(74) *Attorney, Agent, or Firm* — Fenwick & West LLP

(57) ABSTRACT

Embodiments pertain measuring the weld penetration depth, particularly in welding, drilling or machining processes carried out by means of a working laser beam, wherein a measurement light beam of a sensor system is coupled into a processing beam path of the working laser beam in a laser machining head and bundled or focused into a measurement light spot on the surface of a workpiece by means of focusing optics of the processing beam path. The measurement light beam reflected on the surface of the workpiece is then returned to a measurement and evaluation unit of the sensor system in order to obtain information on the distance of the surface of the workpiece from the laser machining head. In order to obtain a surface profile of the workpiece in the region of the vapor capillary, from which the position of the vapor capillary relative to the point of incidence of the working laser beam can be determined, the position of the measurement light spot on the surface of the workpiece is guided over the vapor capillary in the welding direction, as well as transverse to the welding direction. The measurement light spot is during the subsequent laser machining process moved into the determined position of the vapor capillary in order to measure the weld penetration depth.

11 Claims, 3 Drawing Sheets

(51) Int. Cl.
*B23K 26/382* (2014.01)
*B23K 26/03* (2006.01)
*B23K 26/36* (2014.01)
*B23K 31/12* (2006.01)
*B23K 26/08* (2014.01)
*B23K 26/21* (2014.01)
*G01B 11/30* (2006.01)

(52) U.S. Cl.
CPC ............ *B23K 26/36* (2013.01); *B23K 26/382* (2015.10); *B23K 31/125* (2013.01); *G01B 9/02091* (2013.01); *G01B 11/303* (2013.01)

(58) Field of Classification Search
CPC .............. G01B 9/02091; G01B 11/303; G01B 9/02044; G01B 7/10; G01N 27/87; G01N 17/006; G01N 17/04; G01N 2021/8411; G01N 21/00; G01N 21/71; G01N 21/954; G01N 2291/02854; G01N 2291/056; G01N 2291/2634; G01N 2291/2675; G01N 27/82; G01N 27/83; G01N 29/0654; G01N 29/221; G01N 29/225; G01N 29/265; G01N 29/28; G01N 29/48; G01N 2021/8416; G01N 21/45; G01N 21/84; G01N 2223/628; G01N 2291/02827; G01N 23/04; G01N 23/06; G01N 23/087; G01N 29/045; G01N 29/12; G01N 29/30; G01N 29/4436; G01N 23/083; B23K 26/032; B23K 26/24; B23K 31/125; B23K 26/21; B23K 9/123; B23K 26/244; B23K 9/04; B23K 9/092; B23K 15/0046; B23K 20/122; B23K 20/1255; B23K 20/129; B23K 2101/36; B23K 26/03; B23K 26/0626; B23K 26/0643; B23K 26/08; B23K 26/082; B23K 26/702; B23K 26/705; B23K 9/0017; B23K 9/0953; B23K 9/121; B23K 9/125; B23K 9/1735; B23K 9/188; B23K 10/02; B23K 11/0006; B23K 11/02; B23K 11/0935; B23K 11/257; B23K 13/00; B23K 13/06; B23K 15/002; B23K 15/06; B23K 1/00; B23K 1/0012; B23K 20/1225; B23K 20/126; B23K 20/1265; B23K 20/22; B23K 20/24; B23K 20/26; B23K 2101/10; B23K 2101/14; B23K 2101/24; B23K 2103/02; B23K 2103/04; B23K 2103/05; B23K 2103/10; B23K 2103/18; B23K 26/00; B23K 26/034; B23K 26/044; B23K 26/046; B23K 26/048; B23K 26/0604; B23K 26/0648; B23K 26/0652; B23K 26/0665; B23K 26/0876; B23K 26/0884; B23K 26/1224; B23K 26/14; B23K 26/1423; B23K 26/1462; B23K 26/211; B23K 26/22; B23K 26/242; B23K 26/26; B23K 26/282; B23K 26/32; B23K 26/352; B23K 26/36; B23K 26/382; B23K 26/70; B23K 31/003; B23K 31/02; B23K 33/004; B23K 9/00; B23K 9/0672; B23K 9/0732; B23K 9/0956; B23K 9/1006; B23K 9/1043; B23K 9/1056; B23K 9/1062; B23K 9/124; B23K 9/1333; B23K 9/1336
See application file for complete search history.

(56) References Cited

FOREIGN PATENT DOCUMENTS

| DE | 102015012565 B3 | 10/2015 |
| DE | 102014007887 | 11/2015 |
| DE | 102016109909 A1 | 11/2017 |
| EP | 1977850 | 10/2008 |

* cited by examiner

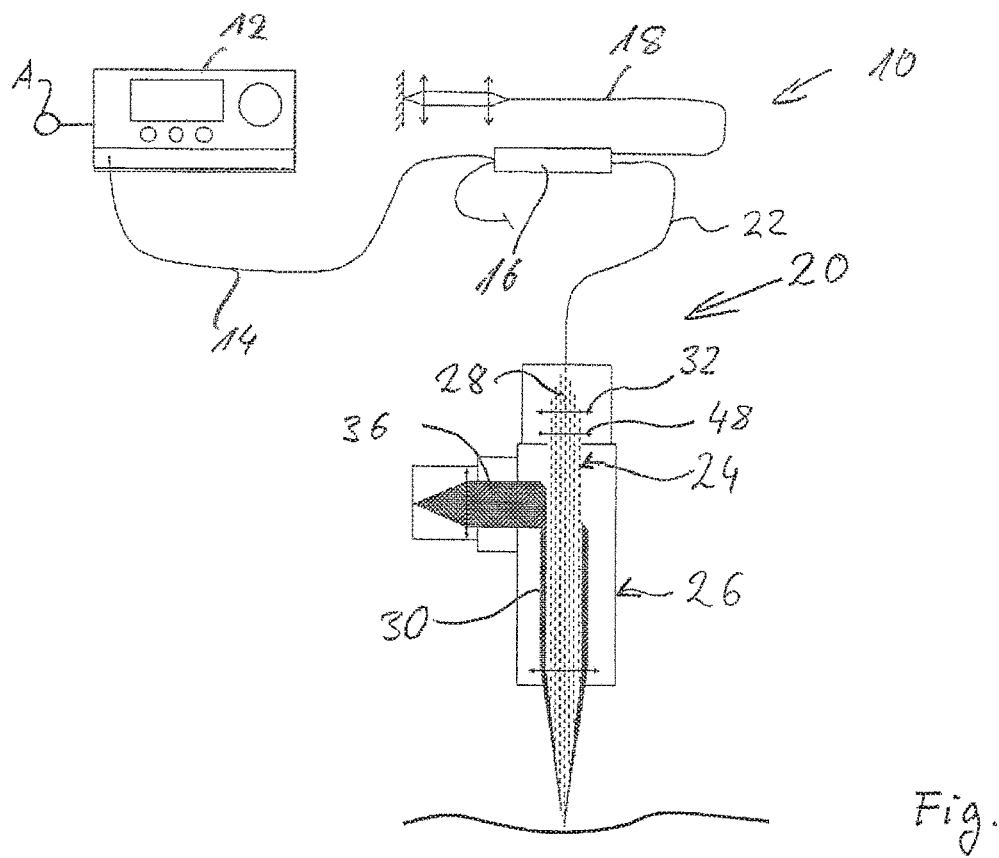
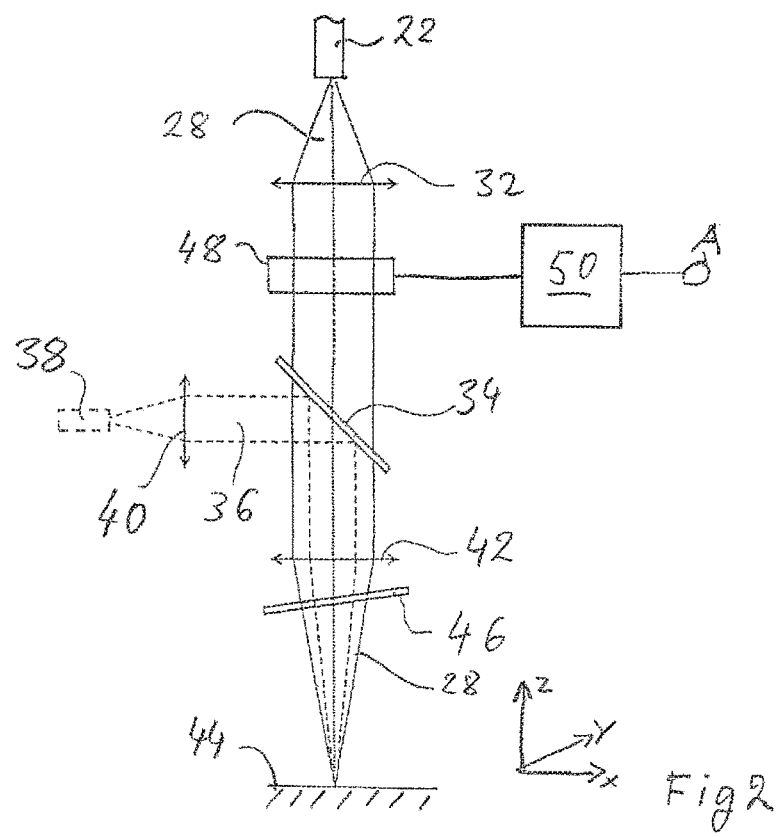
Fig. 1
Fig. 2

METHOD FOR OPTICALLY MEASURING THE WELD PENETRATION DEPTH

CROSS-REFERENCE TO RELATED APPLICATION

This application claims priority under 35 U.S.C. § 119(a) to German patent application No. 10 2017 117 413.3 filed on Aug. 1, 2017, which is incorporated by reference herein in its entirety.

BACKGROUND

The invention pertains to a method for optically measuring the weld penetration depth, particularly in welding, drilling or machining processes carried out by means of laser beams.

In order to optically measure the weld penetration depth, it is known to utilize optical distance measurement sensors that operate according to the principle of optical short-coherence interferometry, in which the measurement light is split into a measurement light beam, which is also simply referred to as measurement beam below, and a reference light beam, which is also simply referred to as reference beam below. The measurement and reference light beams reflected from a measurement arm and a reference arm are superimposed with one another in order to determine the desired distance information from the path differences between the measurement arm and the reference arm.

In this case, the field of application covers machining processes that require the precise and automated positioning of the measurement light beam at a position in the region of the interaction zone between the working laser beam and the workpiece, particularly at the vapor capillary or so-called keyhole produced by the working laser beam in its point of incidence, e.g. in laser welding processes with in-line monitoring of the weld penetration depth to be controlled.

Known technical solutions for precisely positioning the optical measurement light beam in laser welding processes utilize camera-based methods for determining the measurement beam position relative to the working laser beam. These methods are based on an indirect determination of the position of the measurement light beam on the workpiece surface, which is required for measuring the weld penetration depth.

However, the optimal position of the measurement light beam relative to the processing beam for a reliable measurement of the weld penetration depth is dependent on different process parameters—such as the advance speed and the material of the weld metal—and therefore cannot be determined with sufficient accuracy by means of indirect position determination methods.

DE 101 55 203 A1 describes a laser machining device with an observation unit that is realized in the form of a short-coherence interferometer for acquiring surface measurement data. For example, the depth of focus can also be monitored and controlled with a measurement at the machining point. However, it is not described how the measuring point, i.e. the point of incidence of the measurement beam, has to be aligned relative to the machining point in order to obtain a reliable and accurate measurement of the depth of focus or keyhole depth.

DE 10 2015 012 565 B3 concerns a device and a method for increasing the accuracy of an OCT measurement system for laser material machining and describes the positioning of a measurement beam generated by an optical coherence tomograph relative to the position of the laser beam during the machining process with the aid of a spatially resolving sensor such as a camera. In this case, a relative offset between the processing beam and the measurement beam is determined from the spatially resolved information provided by the sensor with consideration of a measurement beam position on a workpiece. However, the positioning of the measurement beam relative to the vapor capillary, i.e. relative to the keyhole, is not described.

DE 10 2013 015 656 B4 concerns a method for measuring the weld penetration depth, in which two measurement beams are guided through processing optics. A first measurement beam is directed at the base of the keyhole in order to measure the distance from the keyhole bottom and a second measurement beam is directed at the surface of the component in order to measure the distance from the component surface. The weld penetration depth can be determined from these two distances. However, it is not described how the measurement beam is aligned at the position of the keyhole.

As described above, all known methods are based on an indirect determination of the position of the measurement beam on the workpiece in order to measure the weld penetration depth. However, this does not make it possible to determine the exact position relative to the vapor capillary, i.e. relative to the keyhole, because it is difficult to measure the exact position of the keyhole in the processing region, i.e. in the region of incidence of the working laser beam, with imaging methods.

SUMMARY

Based on these circumstances, the invention aims to make available a method for optically measuring the weld penetration depth, by means of which the measurement light beam can be precisely positioned at the position of the keyhole in order to thereby realize a reliable measurement of the weld penetration depth in laser machining processes.

This objective is attained with the method according to claim 1. Advantageous embodiments and enhancements of the invention are described in the dependent claims.

In order to measure the weld penetration depth, particularly in welding, drilling or machining processes carried out by means of a working laser beam, the invention accordingly proposes that a measurement light beam of a sensor system, particularly an OCT-based sensor system, is coupled into a processing beam path of the working laser beam in a laser machining head. The measurement light beam is bundled or focused on the surface of a workpiece by focusing optics of the processing beam path in order to form a measurement light spot on the workpiece surface. The measurement light beam reflected in the measurement light spot on the surface of the workpiece is returned to a measurement and evaluation unit of the sensor system in order to obtain information on the distance of the surface of the workpiece from any reference position, particularly from the laser machining head. In order to obtain a surface profile of the workpiece in the region of the vapor capillary, the position of the measurement light spot on the surface of the workpiece is guided over the vapor capillary in the welding direction, as well as transverse thereto. The position of the vapor capillary relative to the point of incidence of the working laser beam is determined from the surface profile of the workpiece in the region of the vapor capillary. During a subsequent laser machining process, the measurement light spot for measuring the weld penetration depth is moved into the determined position of the vapor capillary such that the measurement light beam is precisely aligned at the vapor capillary, i.e., the keyhole, and a reliable and exact measurement of the keyhole depth and therefore the weld penetration depth is ensured.

According to an advantageous embodiment, it is proposed that the lowest point of the vapor capillary is determined as the position of the vapor capillary relative to the point of incidence of the working laser beam. This additionally improves the accuracy of the measurement of the weld penetration depth because the depth of the vapor capillary, i.e. the keyhole, essentially corresponds to the depth of the weld pool in the interaction zone between the working laser beam and the workpiece.

It is advantageously proposed that the measurement light spot is guided over the vapor capillary on linear paths, wherein the surface profile is determined from the measurement data along the linear paths by means of curve fitting. A particularly simple and fast determination is thereby achieved.

The surface profile is particularly determined from the measurement data along the linear path transverse to the welding direction by means of curve fitting according to a Gaussian distribution whereas the surface profile is determined from the measurement data along the linear path in the welding direction by means of curve fitting according to a Maxwell-Boltzmann distribution.

An alternative embodiment of the invention is characterized in that the measurement light spot is guided over the vapor capillary on spiral-shaped paths and order to subsequently determine the optimal measurement spot position from the distance measurement data.

It is basically also possible to determine the weld penetration depth along a weld seam from the surface profiles during the welding process. However, this would lead to discontinuous monitoring of the weld penetration depth along the weld seam. According to the invention, it is therefore proposed that the position of the vapor capillary relative to the point of incidence of the working laser beam is determined for predefined process parameters of a machining process during a test machining run and stored as the measurement spot position for this machining process. In machining processes that are classified based on the process parameters, for which the measurement spot position was determined, the weld penetration depth can therefore be monitored quasi-continuously and, if applicable, readjusted. Due to the readjustment of the weld penetration depth, the present invention therefore not only makes it possible to carry out high-quality laser machining processes, particularly weldments, but also to reliably document the weld penetration depth over the entire weld seam for quality control and quality assurance purposes.

An advantageous enhancement of the invention is characterized in that the respective positions of the vapor capillary relative to the point of incidence of the working laser beam are determined for predefined process parameters of different machining processes during test machining runs and stored as the measurement spot positions for these machining processes.

According to the invention, the ideal measurement beam position for different processes is therefore determined and subsequently stored, e.g. directly in the sensor system. In this way, a system can successively produce weldments with different process parameters, wherein the predetermined positions are respectively adjusted by means of a corresponding actuator system.

With respect to machining processes, in which the advance direction changes during the course of the machining process, an advantageous enhancement of the invention proposes that the measurement spot positions stored for the corresponding process parameters are adapted to the respective advance direction. In a welding process, in which the advance direction changes along the course of the weld seam, a corresponding actuator system can therefore adapt the predetermined and stored ideal positions for the measurement light beam to the advance direction for the measurement of the weld penetration depth.

The inventive method is advantageously carried out with a device for measuring the weld penetration depth, particularly in welding, drilling or machining processes carried out by means of laser beams, wherein said device comprises: a laser machining head, through which a processing beam path with focusing optics for focusing the working laser beam on a workpiece extends, a sensor system for generating a measurement light beam, which can be coupled into the processing beam path in the laser machining head and bundled or focused in a measurement light spot on a surface of the workpiece by means of the focusing optics of the processing beam path, and an actuator system with a deflection unit for the measurement light beam. The sensor system and the actuator system are configured in such a way that they can carry out an inventive method for measuring the weld penetration depth.

BRIEF DESCRIPTION OF DRAWINGS

Examples of the invention are described in greater detail below with reference to the drawings. In these drawings:

FIG. 1 shows a simplified schematic representation of a device for measuring the weld penetration depth according to the present invention;

FIG. 2 shows a simplified schematic representation of a laser machining hand with an optical system for coupling in the measurement light beam of a sensor system for the measurement of the weld penetration depth;

Corresponding components and elements are identified by the same reference symbols in the different figures.

DETAILED DESCRIPTION OF EMBODIMENTS

Figure 3:
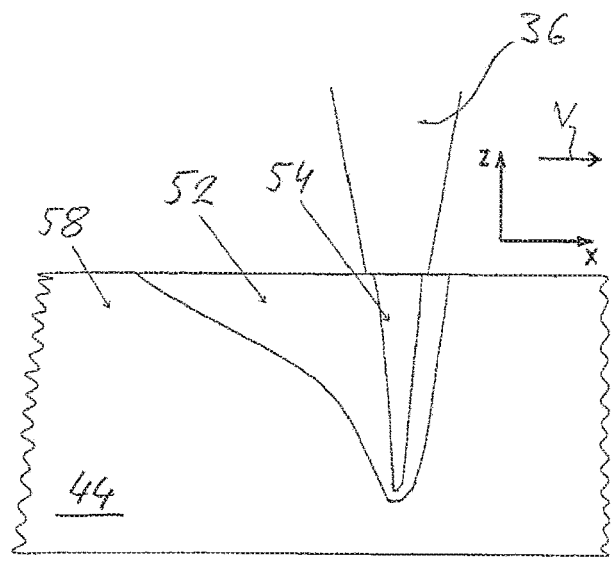
FIG. 3 shows a schematic sectional view of a workpiece in order to illustrate a vapor capillary (keyhole) during the welding process.

According to FIG. 1, the device for measuring the weld penetration depth comprises a sensor system 10 that is based on the principle of optical coherence tomography, in which the coherence properties of light are utilized with the aid of an interferometer. The sensor system 10 comprises a measurement and evaluation unit 12 with a broadband light source (superluminescent diode, SLD; SweptSource light source (spectrally variable light source) or the like), the measurement light of which is coupled into an optical waveguide 14. The measurement light is split into a reference arm 18 and a measurement arm 20, which comprises an optical waveguide 22 and a measurement light beam path 24 extending through the laser machining head 26, in a beam splitter 16 that preferably features an optical fiber coupler. The measurement light beam path 24 comprises an optical system for coupling the measurement light beam 28 into a processing beam path 30 in the laser machining head 26. According to FIG. 2, in particular, the optical system for coupling the measurement light beam 28 into the processing beam path 30 comprises collimating optics, 32, which collimate the measurement light beam 28 exiting the optical waveguide 22 such that it can be coupled into the processing beam path 30 in the laser machining head 26 by means of a partially transparent mirror 34 and superimposed with the working laser beam 36. The working laser beam 36, which is fed to the laser machining head 26, for example, via a corresponding optical waveguide 38, is collimated by collimating optics 40 and deflected to focusing optics 42 by means of the partially transparent mirror 34, wherein said focusing optics bundle or focus the working laser beam 36 on the surface of a workpiece 44 together with the measurement light beam 28. A protective glass 46 is arranged between the focusing optics 42 and the workpiece 44 in order to protect the focusing optics 42 against spatters and the like from the interaction zone between the working laser beam 36 and the workpiece 44.

In order to guide the measurement light beam 28 and therefore the measurement light spot produced on the surface of the workpiece 44 by the measurement light beam 28 over the workpiece surface in the welding direction, as well as transverse to the welding direction, an actuator system with a deflection unit 48 is provided and capable of moving the measurement light beam 28 over the surface of the workpiece in two intersecting directions, e.g. in the x-direction and the y-direction, in order to scan a surface contour of the workpiece 44 and to measure a corresponding surface profile. The deflection unit 44 may be realized in the form of a galvano scanner that has two essentially perpendicular scanning directions with reflective optics or with transmissive optics, e.g. prisms. The deflection unit 48 could optionally also be realized in the form of a device with optics that can be displaced in two directions. The deflection unit 48 is controlled by a control unit 50 in such a way that it moves the measurement light beam 28 over the surface of the workpiece 44 during a test or measurement welding run in order to measure a surface profile or deflects the measurement light beam 38 and therefore the measurement light spot at the keyhole position determined for the process parameters of a welding process during a production welding process. The control unit 50 may be realized in the form of an autonomous unit, which is connected to the sensor system 10, particularly to its measurement and evaluation unit 12, as schematically indicated with the inputs and outputs A of the measurement and evaluation unit 12 and the control unit 50, or integrated into the sensor system 10.

Figure 4:
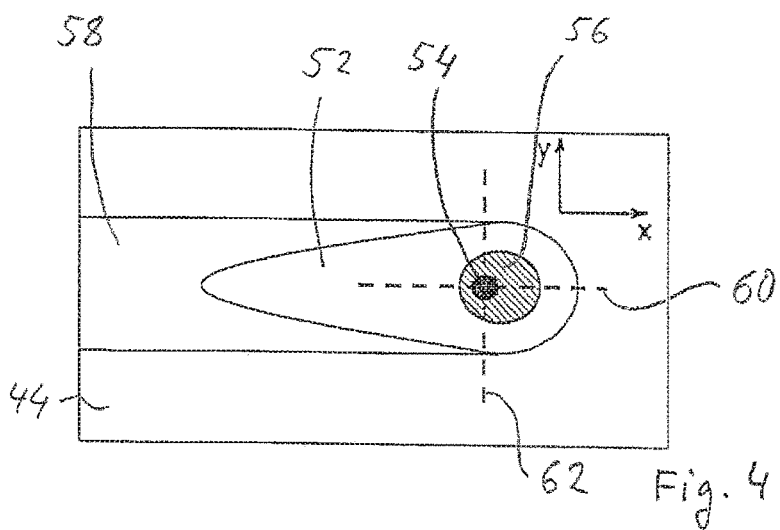
FIG. 4 shows a schematic top view of the surface of a workpiece in the region of an interaction zone between the working laser beam and the workpiece in order to illustrate linear scanning lines for determining a surface profile.

According to FIGS. 3 and 4, the interaction zone between the working laser beam 36 and the workpiece 44 comprises a region of liquid molten mass 52, i.e. a weld pool, which surrounds a vapor capillary 54 located in the region of incidence 56 of the working laser beam 36 on the workpiece 44. FIG. 3 shows that, with the exception of a correction value, the depth of the vapor capillary 54 essentially corresponds to the depth of the weld pool. The solidified molten mass 58 of the finished weld seam is then located behind the interaction zone between the laser beam 36 and the workpiece 44 referred to the advanced direction (advanced direction V in FIG. 3; x-direction in FIG. 4).

In order to determine the position of the vapor capillary 54 relative to the region of incidence 56 of the working laser beam 36 for a certain laser machining process, which can be classified based on its process parameters such as advance speed, laser output, focal position of the working laser beam 36 in the z-direction, i.e. in the direction perpendicular to the workpiece surface, material of the weld metal, i.e. the workpiece 44, and/or seam geometry, the position of the measurement light beam 28, i.e. of the measurement light spot produced thereby on the workpiece 44 during the welding process, is moved over the vapor capillary 54, i.e. over the keyhole, on a linear path 60, 62 in the welding direction, as well as perpendicular to the welding direction, with the aid of the deflection unit 48 during a test or measurement welding run.

Figure 5A:
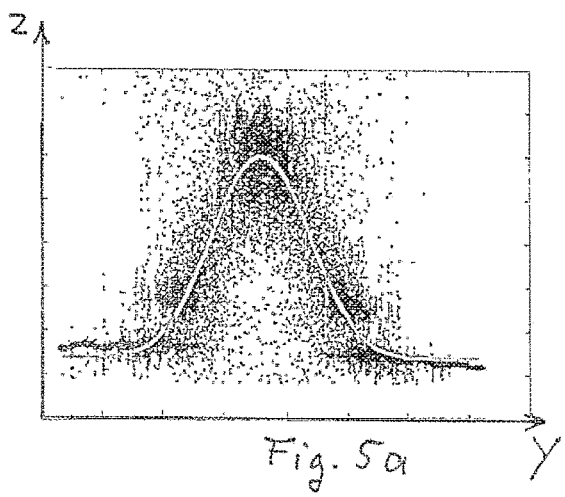
FIG. 5a shows distance measurement data of a welding run on a linear path transverse to the welding direction.

During this process, distance data is recorded along the scanning paths with the aid of the sensor system 10. To this end, the measurement light beam 28 coupled into the processing beam path 30 is bundled or focused into a measurement light spot on the surface of the workpiece 44 by the focusing optics 42 and guided over the surface of the workpiece 44 along the chosen scanning paths by the deflection unit 48. The measurement light beam 28 reflected on the surface of the workpiece 44 is superimposed with the reference light beam from the reference arm 18 in the beam splitter 16, which comprises an optical fiber coupler, and returned to the measurement and evaluation unit 20, wherein the measurement and evaluation unit obtains information on the distance of the surface of the workpiece 44 from any reference position above the workpiece 44, for example from the position of the laser machining head 26 or the position of the focusing optics 42 therein, from the information on the path differences in the reference arm 18 and the measurement arm 20. In order to determine the optimal position of the measurement light spot during the measurement of the weld penetration depth, the course of the surface contour of the workpiece 44 in the region of the interaction zone between the working laser beam 36 and the workpiece 44 along the paths, 60, 62 is determined from the distance data distributions, which are illustrated in the form of point clouds along the respective paths in FIGS. 5a and 5b, by means of corresponding curve fitting.

The surface profile of the workpiece 44 along the path 62, which in the region of the vapor capillary 54 represents its depth profile perpendicular to the advance direction V, is symmetrical in this case. In order to determine the position of the lowest point of the vapor capillary 54, which represents the ideal position for the measurement light spot or the point of incidence of the measurement light beam 28 on the workpiece 44, a symmetric curve is set through the distance data for the curve fitting. The curve fitting can be advantageously carried out by means of a Gaussian distribution.

$$f(y) = \frac{1}{\sigma\sqrt{2\pi}} e^{-\frac{1}{2}((y-\mu)/\sigma)^2}$$

In this case, y is the position of the measurement light spot on the workpiece in the y-direction, i.e. perpendicular to the advance direction V (see FIG. 3), wherein $\mu$ represents the expectancy value and $\sigma^2$ represents the variance of the distribution.

Figure 5B:
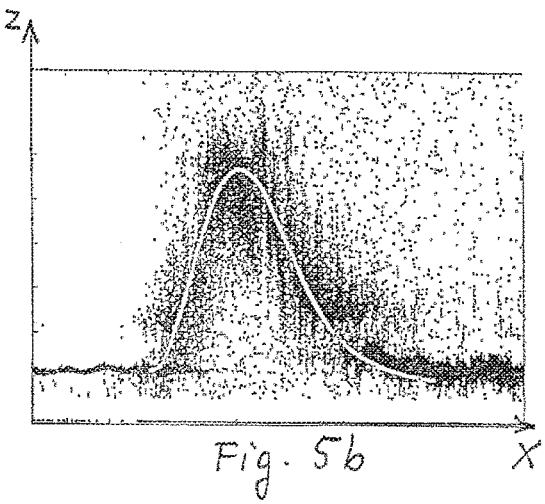
FIG. 5b shows distance measurement data of a welding run on a linear path in the welding direction.
Figure 6:
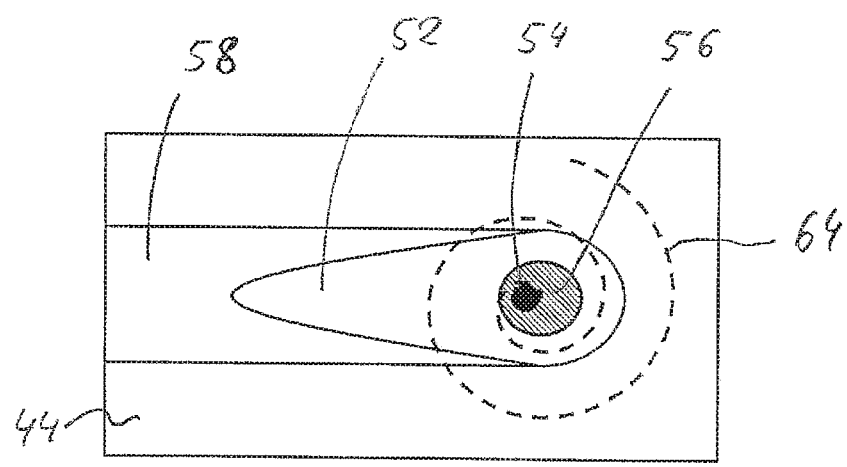
FIG. 6 shows a schematic top view of the surface of a workpiece in the region of an interaction zone between the working laser beam and the workpiece in order to illustrate spiral-shaped scanning lines for determining a surface profile.

According to FIG. 5b, depth profile of the vapor capillary 54 in the advance direction is asymmetric and approximately corresponds to a Maxwell-Boltzmann distribution.

$$f(x) = k1 * x^2 * e^{-k2 * x^2}$$

In this case, x represents the position of the measurement beam 28 on the workpiece surface in the advance direction and k1 and k2 are parameters of the distribution. The maximum of the distribution can be determined from the parameters.

Consequently, the position of the lowest point of the vapor capillary 54 relative to the region of incidence 56 of the working laser beam 36 is known such that the measurement light beam 28 can be precisely directed into the keyhole, i.e. into the vapor capillary 54, during the subsequent machining of workpieces 44 in a laser machining process, which is carried out with the same process parameters as the measurement welding run, in order to thereby achieve a reliable and precise measurement of the weld penetration depth.

The position of the keyhole 54 relative to the region of incidence 56 of the working laser beam 36 is advantageously stored together with the associated process parameters. This procedure, i.e. the determination of the position of the vapor capillary 54, always takes place if the laser machining head 26 should carry out a welding process with process parameters, for which no optimal position of the measurement light spot relative to the vapor capillary 54 has been determined yet. In this case, the position of the keyhole is each time stored together with the respective process parameters such that the positions of the keyholes are over the course of time known for a plurality of different laser machining processes and a test welding run is only required during a change-over from one laser machining process to another laser machining process if the latter laser machining process has never been carried out before by the laser machining head.

Depending on the scanner optics used in the deflection unit 48, it may be necessary to carry out the determination of the position of the vapor capillary repeatedly, namely even if this was already done with the given welding parameters and stored. External interference effects such as temperature changes particularly can lead to a drift or variation of the scanning position of the deflection unit 48, i.e. the position of the measurement light spot, such that the measurement light beam 28 is no longer incident in the vapor capillary 54. Due to this drift, it may be necessary to determine the position of the vapor capillary 54 repeatedly within certain time intervals, e.g. once a day or once a week.

The positions of the vapor capillary for the different laser machining processes are advantageously stored in a memory that is integrated into the control unit 50 or in a memory in the sensor system 10. The control unit 50 may also form an integral component of the sensor system 10; consequently, a system can successively produce weldments with different process parameters, wherein the measurement light spot, i.e., the measurement light beam 28, is respectively adjusted to the predetermined positions of the vapor capillary 54 by means of the deflection unit 48.

If the advance direction along the course of the weld seam changes during a welding process, i.e. if the advance direction deviates from the original advance direction, which is assumed to be the x-direction, the predetermined and stored ideal positions for the measurement light spot are adapted to the changed advance direction.

Instead of determining the position of the vapor capillary 54, i.e. the position of the lowest point of the vapor capillary 54, with the aid of distance data that was obtained along two intersecting linear paths 60 and 62, it is also possible to guide the measurement light spot on a spiral-shaped path 64 in the interaction zone between the working laser beam 36 and the workpiece 44 in order to determine the position of the vapor capillary 54 relative to the region of incidence 56 of the working laser beam 36. In this case, the approximate position of the vapor capillary 54 can be initially determined along a relatively wide spiral-shaped path 64 from a three-dimensional, funnel-shaped surface or depth profile in order to subsequently determine the surface or depth profile in a second measurement step by means of a narrow spiral-shaped path around the region of incidence 56 of the working laser beam 36, wherein the exact position of the vapor capillary 54 can then be determined from this surface or depth profile.

It would furthermore also be conceivable to measure the surface of the workpiece 44 in the interaction zone between the working laser beam 36 and the workpiece 44 linearly, wherein the lines or paths are respectively displaced over the workpiece perpendicular to their longitudinal extent in order to determine the exact position of the keyhole from the thusly measured surface or depth profile.

What is claimed is:

1. A method for measuring weld penetration depth in welding, drilling or machining processes carried out by a working laser beam, wherein
    bundling or focusing a measurement light beam of an optical coherence tomography (OTC) based sensor system into a measurement light spot on a surface of a workpiece by focusing optics of a processing beam path of a working laser beam in a laser machining head,
    reflecting the measurement light beam from the surface of the workpiece to a measurement and evaluation unit of the sensor system in order to obtain information on a distance of the surface of the workpiece from the laser machining head,
    guiding a position of the measurement light spot on the surface of the workpiece over vapor capillary in the welding direction and a direction transverse to the welding direction, in order to obtain a surface profile of the workpiece in a region of the vapor capillary,
    determining the position of the vapor capillary relative to a point of incidence of the working laser beam from the surface profile of the workpiece in the region of the vapor capillary, and
    moving the measurement light spot relative to the working laser beam by a deflection unit during a laser machining process into the determined position of the vapor capillary in order to measure the weld penetration depth.

2. The method according to claim 1, wherein the lowest point of the vapor capillary is determined as the position of the vapor capillary relative to the point of incidence of the working laser beam.

3. The method according to claim 1, wherein the measurement light spot is guided over the vapor capillary along linear paths.

4. The method according to claim 3, wherein the surface profile is determined from the measurement data along the linear paths curve fitting.

5. The method according to claim 4, wherein the surface profile is determined from the measurement data along the linear path transverse to the welding direction by curve fitting according to a Gaussian distribution.

6. The method according to claim 4, wherein the surface profile is determined from the measurement data along the linear path in the welding direction by curve fitting according to a Maxwell-Boltzmann distribution.

7. The method according to claim 1, wherein the measurement light spot is guided over the vapor capillary on spiral-shaped paths.

8. The method according to claim 1, wherein the position of the vapor capillary relative to the point of incidence of the working laser beam is determined for predefined process parameters of a machining process during a test machining run and stored as the measurement spot position for this machining process.

9. The method according to claim 8, wherein the respective positions of the vapor capillary relative to the point of incidence of the working laser beam are determined for predefined process parameters of different machining processes during test machining runs and stored as the measurement spot positions for these machining processes.

10. The method according to claim 8, wherein the measurement spot position stored for the corresponding process parameters is adapted to the respective advance direction for a machining process, in which the advance direction changes during the course of the machining process.

11. A device for measuring weld penetration depth in welding, drilling or machining processes carried out by a working laser beam, comprising:
 a laser machining head configured to focus the working laser beam on a workpiece in a processing beam path using focusing optics,
 an optical coherence tomography (OTC) based sensor system configured to generate a measurement light beam coupled into the processing beam path and bundled or focused in a measurement light spot on a surface of the workpiece by the focusing optics in the processing beam path, and
 an actuator system with a deflection unit configured to move for the measurement light beam relative to the work laser beam.

* * * * *